United States Patent

Hill

[11] 3,990,711
[45] Nov. 9, 1976

[54] RESTRAINED ELASTOMERIC SEAL RING MEANS

[76] Inventor: Ralph W. Hill, 2163 S. Sandusky, Tulsa, Okla. 74114

[22] Filed: May 9, 1975

[21] Appl. No.: 576,000

[52] U.S. Cl. .............................. 277/168; 227/181
[51] Int. Cl.² ......................................... F16J 9/00
[58] Field of Search ......................... 277/168–172, 277/187, 189, 215, 235 B, 181–184

[56] References Cited
UNITED STATES PATENTS

| | | | |
|---|---|---|---|
| 1,366,075 | 1/1921 | Heeter | 277/187 |
| 2,157,867 | 5/1939 | Robertson et al. | 277/187 |
| 2,438,153 | 3/1948 | Dick | 277/187 |
| 2,770,510 | 11/1956 | Collins | 277/187 |
| 2,789,844 | 4/1957 | Kessler | 277/169 |
| 3,017,190 | 1/1962 | Lindstrom | 277/187 |
| 3,195,902 | 7/1965 | Tisch | 277/215 |

Primary Examiner—Robert I. Smith
Attorney, Agent, or Firm—Head, Johnson & Chafin

[57] ABSTRACT

An elastomeric sealing system for sealing between two metal plates in contact along a contact plane and simultaneously sealing between a bored opening through the plates perpendicular to the contact plane, and a cylindrical piston in the bored opening. The system provides a recess positioned at the contact plane into which an elastomeric seal ring is positioned. Contrary to the conventional type of O-ring seal, the recess may contain two or even three portions and the seal ring correspondingly will have two or three parts adapted to fit into the two or three portions of the recess. The purpose of the second and/or third portions of the ring is to prevent the seal ring from moving radially inwardly and out of the recess when the piston is removed.

7 Claims, 7 Drawing Figures

RESTRAINED ELASTOMERIC SEAL RING MEANS

CROSS REFERENCE TO RELATED APPLICATION

This application is related to my copending application, Ser. No. 500,759; filed Aug. 26, 1974, entitled "FLUID CONTROL VALVE."

BACKGROUND OF THE INVENTION

This invention lies in the field of elastomer seal ring means. More particularly it concerns a seal ring adapted to seal a contact surface between two plates, and simultaneously to seal between a cylindrical opening bored through the plates perpendicular to the contact surface and a piston inserted into the bored opening.

In the prior art it has been customary to provide a recess in the wall of the bored opening at the contact plane between the two plates and to insert a toroidal ring, or O-ring, into the recess to seal between the plates and the piston.

As the piston moves throughout its full stroke it may move beyond the position of the seal ring and some means must be provided to restrain the seal ring in its recess so that as the piston moves back to the position of the seal ring the ring will be within the recess.

SUMMARY OF THE INVENTION

It is a primary object of this invention to provide an elastomeric seal ring means for simultaneously sealing between the contact surface between two parrallel plates and between the wall of an opening bored through the two plates perpendicular to the contact plane and a piston inserted into the bored opening. It is a further object of this invention to provide a particular cross sectional shape to the recess and to the seal ring so that the seal ring is prevented from migrating radially inwardly out of the recess in the wall of the bored opening.

These and other objects are realized and the limitations of the prior art are overcome in this invention by providing a recess which is cut into the surface of at least one of the plates. The recess has at least two adjacent portions, one contiguous with the bore hole wall and the other radially outward from the first portion. The two portions are of different depth perpendicular to the contact plane, that is, in the direction of the axis of the borehole. There may also be three contiguous portions to the recess, each of greater radial distance from the wall of the bore.

The recess may be cut into both surfaces at the contact plane, that is, they may be cut equally into each of the two plates, or one plate can have a plane surface and the entire recess can be cut into the surface of the second plate.

In the case of two portions to the recess, the first portion adjacent the borehole wall can be larger than the second portion more distant from the wall, in which case the seal ring will have a first part which is substantially circular in cross section, similar to an O-ring, with a planar annular fin extending outwardly in the plane of the ring. The dimension of the recess is such as to strongly clamp this planar extension and thus prevent the seal ring from moving radially inwardly.

In the case of the two portion recess, the portion adjacent the bore hole can be shallower than the portion more distant from the bore hole, which in effect provides one or two lips at the bore hole wall which restrain a seal ring which has a larger part outwardly of a smaller part, the larger part being restrained by the lip or the lips so that it cannot move inwardly toward the bore.

In the case of the three portions to the recess, the seal ring would then comprise three parts, the inner part being substantially circular in cross section like an O-ring, the outermost part can be circular or rectangular in cross section, and the two parts are joined by a short thin web. The outermost part becomes locked behind two projecting lips or ridges, and so prevents the seal ring from moving inwardly into the bore hole.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
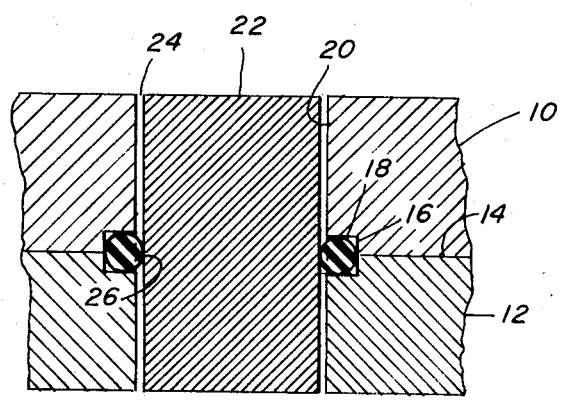
FIG. 1 illustrates the conventional prior art design.

Referring now to the drawings and in particular to FIG. 1, there is shown a conventional prior art construction comprising two plates 10 and 12 which are in contact along a contact plane 14 although not shown, the plates 10, 12 would be bolted together, as in my copending application SN. There is a borehole 20 cut perpendicular to the plane 14 and a piston 22 inserted into the borehole with a radial annular gap 24 between the piston and the borehole wall 20. A recess 16 is cut in the wall of the borehole at the contact plane 14 and an O-ring of suitable dimension is inserted into the recess so that when the piston 22 is positioned in the borehole 20 the O-ring will seal between the plates 10 and 12 and the piston 22 along the contact 26.

When the system of FIG. 1 is used, if the piston 22 is moved axially sufficiently far it will move beyond the plane of the contact plane 14 and therefore under unbalanced fluid pressure the O-ring 18 will be free to move inwardly into the borehole instead of remaining within the recess so that as the piston moves back into position the O-ring is in conflict and can be damaged by the piston and the sealing action can be lost.

It is an important object of this invention to provide a sealing means for the situation of FIG. 1 wherein the seal ring is restrained so that it cannot migrate or move radially inwardly into the path of the piston.

Figure 2:
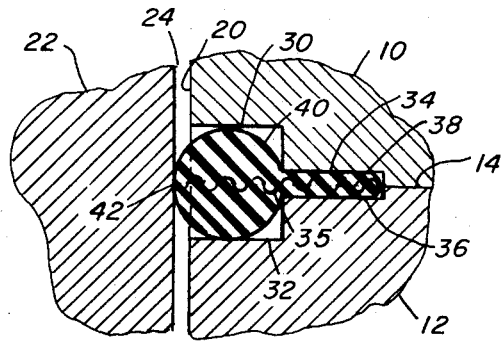
FIG. 2 illustrates an embodiment in which the seal ring has an inner portion of circular cross section and an outer portion comprising a thin annular web.

Referring now to FIG. 2 there is shown one embodiment in which the seal ring comprises a circular cross section O-ring with a planar web extending radially outwardly. The recess within the plates 10 and 12 has two parts, a first portion 30, 32 which seals the circular part of the ring, and a portion 34, 36 which is adapted to clamp the radial web part 38 of the seal ring. This clamping action is sufficient to prevent the O-ring from moving inwardly when the piston 22 is moved out of contact with the sealing protion 42 of the O-ring 40. If desired, the faces 34 and 36 of the recess can be roughened or grooved so as to bite into the web portion 38 of the seal ring and restrain it strongly within the recess.

In order to provide sufficient strength to the web 38, a woven mesh 35 can be molded into the ring 40 and the web 38. The mesh can be of plastic, such as nylon, etc. or glass fibers, etc.

In FIG. 2 it is shown that the recesses 30, 34 and 32, 36 are cut more or less equally into both plates 10 and 12, on opposite sides of the contact plane 14. As will be shown in FIGS. 3B and 4B, it is equally possible to cut the entire recess into one plate, keeping the other plate surface planar.

Figure 3A:
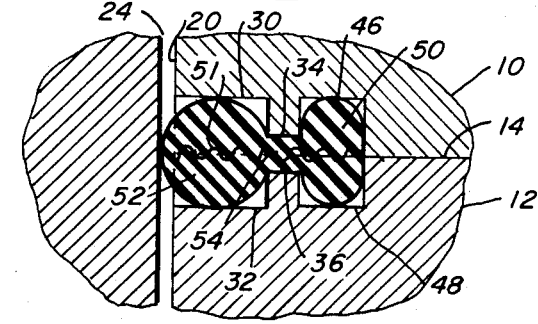
FIGS. 3A, 3B and 3C show three variations of a design in which the inner part of the seal ring is circular cross section, the outer part is of circular or rectangular construction with a thin web joining the two parts.
Figure 3B:
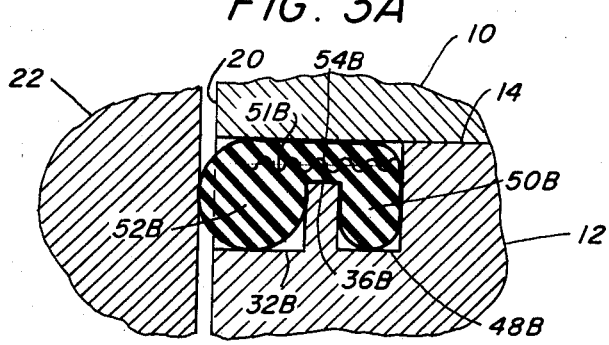
Figure 3C:
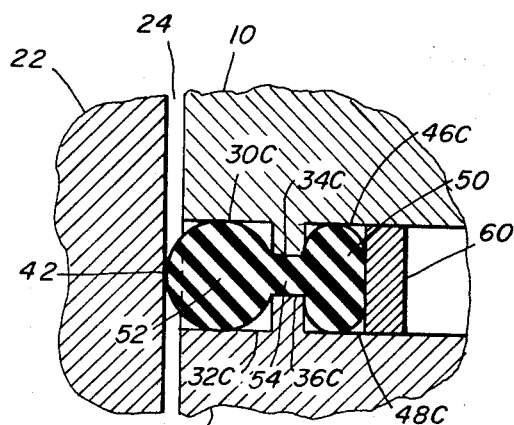

Referring now to FIGS. 3A, 3B and 3C, another embodiment of this sealing system is shown. The characteristic of this embodiment is that the seal ring is made in three parts. A first part which is substantially circular in cross section and does the actual sealing, a second part 54 which is a short rib or neck portion, and a third part 50 which again is of larger dimension than the neck portion. The dimension of part 50 in a direction along the bore or perpendicular to the contact surface 14, can be equal to, greater than, or less than, that of the seal portion 52. It will be clear that with a type of construction of the recess as shown in FIG. 3A, in which there is a first portion 30, 32 of large dimension along the borehole, a second portion 34, 36 of lesser dimension and a third portion 50 again of larger dimension, provides a pair of ridges 34 and 36, or lips, which are adapted to restrain the seal ring from moving, by locking the third part 50 in its cavity 46, 48.

In general, the first portion 30, 32 of the recess will be more or less of the same shape and size as the recess 16 of FIG. 1 with a corresponding circular portion 52 of the seal ring which will seal against the three surfaces 30, 32 and 22. As was shown in FIG. 2, the neck or web 54 can be strengthened by the mesh 51 molded in the ring through the neck 54 and anchored in the parts 50, 52.

FIG. 3B shows a variation of the embodiment of FIG. 3A in which the recess is cut entirely into the plate 12, there being three portions, the large portion 32B at the bore wall 20, a shallower portion 36B and a deeper portion 48B, at greater radius. The seal ring that fits into this recess similarly has three parts, the only difference between this ring and that of FIG. 3A is that the web or neck 54B joining the two parts is offset to one side in FIG. 3B, where in FIG. 3A it is along the axis of the ring.

In FIG. 3C, the seal ring 52, 54, 50 is substantially the same as that of FIG. 3A. However, instead of machining a recess into one or both of the plates 10 and 12, about the contact plane 14 short ridges 34C and 36C are provided on the surface of the two plates 10 and 12. In other words, the surface 30C ad 46C can be part of the same surface of the plate 10 and correspondingly the portions 32C and 48C can be two parts of the same surface of plate 12. In this case a ring 60 of suitable diameter and width is provided as a spacer between the two plates 10 and 12, so that as they are clamped together (not shown) they are prevented from moving together any closer than the width of the ring 60, which then provides, in effect, the same recess space for the seal ring shown in FIG. 3A.

Figure 4A:
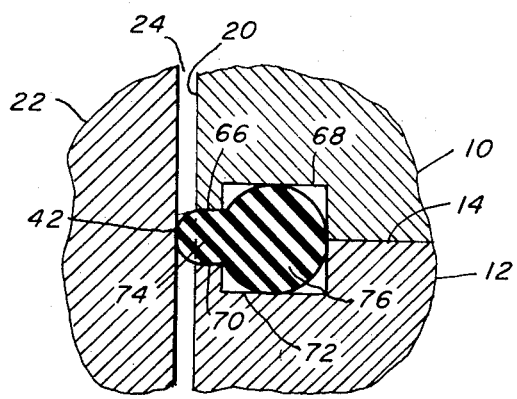
FIGS. 4A and 4B show an embodiment in which there are two portions to the recess, the portions nearest the bore hole being of smaller longitudinal dimension and the seal ring being larger at its outermost part so as to lock behind the lip or lips of the recess.

Referring now to FIG. 4A, there is shown a recess which has two parts similar to FIG. 2, except that the part closest to the borehole wall is of lesser depth perpendicular to the plane 14 than the part at greater radius. The portions 66 and 70 of the recess form an opening for the part 74 of the seal ring which should be of sufficient longitudinal dimension to provide, in effect an O-ring, which will contact at 42 with the piston wall 22. the recess portion 68 and 72 are of greater depth and the part 76 of the seal ring which fits into that portion of the recess is locked in by reason of the lips 66 and 70.

Figure 4B:
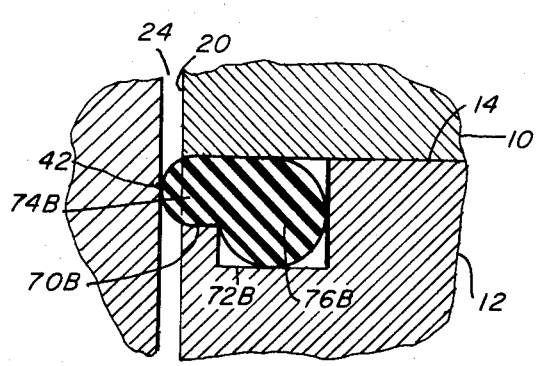

In FIG. 4B a similar situation is shown to that of FIG. 4A, except that the two parts of the recess are cut entirely into plate 12 and plate 10 has its surface at the contact plate 14. Here again, the seal ring has an outer larger portion 76B and a smaller inner portion. The outer portion being locked behind the lip 70B. Although not shown, the rings of FIG. 4A, 4B could have a reinforcing mesh if desired.

The seal rings of this invention comprise rings of elastomeric material which have, in cross section, two or three or more portions. The first portion is for the purpose of providing the seals and the second and/or third portions are for the purpose of retaining the seal ring within the proper recess. One of the means for retaining the ring is to clamp the second part tightly so as to prevent its movement radially inwardly into the borehole. The other method as exemplified in FIGS. 3 and 4 is to provide an enlarged portion which is locked behind one or two lips or ridges so as to prevent the ring from moving outwardly. It will be clear that any suitable elastomeric material can be used for construction of the seal ring means, and such material can be used with or without reinforcement.

Also, while I have shown the recess in the plates which form the wall of the bore hole, or cylinder, the piston could equally well be made in two pieces bolted together with the recess cut into these two pieces with the seal ring placed in this recess portion of the seal ring would then extend radially outwardly to seal against the smooth wall of the cylinder.

In this case the description of the seal ring would be different, with the parts which were of greater radius now being of lesser radius, etc.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. An elastomeric sealing system for sealing between two metal plates clamped together in contact along a contact plane and for simultaneously sealing between a bored opening through the plates perpendicular to the contact plane and a cylindrical piston in the bored opening, an elastomeric seal means positioned in a recess located at the contact plane, and including means to radially restrain the seal means so as to retain the seal within the recess when the piston is removed from the bore, comprising:

a. a recess cut into at least one of said plates at said contact plane, said recess comprising three annular portions;
  1. the first portion having a selected dimension perpendicular to said contact plane and communicating with said bore;
  2. the second or intermediate portion having a dimension perpendicular to said contact plane of less than one-half said selected dimension of said first portion, the second portion communicating with said first portion; and
  3. the third portion having a dimension perpendicular to said contact plane of at least twice the dimension of said second portion, the third portion communicating with said second portion; and
b. said elastomeric seal means comprising a ring, the cross-section of said ring comprising three integral parts;
  1. the first part being sealably received in said recess first portion and extending radially inwardly of the wall of said bore to seal against said piston;
  2. the second or intermediate part being of a dimension perpendicular the axis of the seal ring less than one half the perpendicular dimension of said first ring part, the second ring part being compressibly received in said recess second portion; and
  3. the third part being of a dimension perpendicular to the axis of the seal ring at least twice the dimension of said second ring part, the third ring part being compressibly received in said recess third portion.

2. The system as in claim 1 in which said recess is cut in only one plate, the second surface for said seal means to seal against being the opposing plane surface of the second plate.

3. The system as in claim 1 in which said recess is cut into both plates at their mating surfaces.

4. The system as in claim 1 including a reinforcing mesh molded into said seal ring.

5. The system as in claim 4 wherein said reinforcing mesh is in the form of a thin reinforcing web molded in said elastomeric seal means, the web being of short dimension perpendicular to said contact plane, and in a plane parallel to said contact plane, the web being positioned intermediate the edges of said ring second part.

6. The system as in claim 1 in which said elastomeric seal means has a cross section formed as follows: the first part being of substantially circular cross section, the third part being of substantially circular cross-section, and the second part comprising a web joining said first and third parts.

7. An elastomeric sealing system for sealing between two metal planes clamped together in contact along a contact plane and for simultaneously sealing between a bored opening through said plates perpendicular to said contact plane and a cylindrical piston in said bored opening, an elastomeric seal means positioned in a recess located at said contact plane, and including means to radially restrain said seal means so as to remain inside said recess when said piston is removed from said bore, comprising:
a. a recess cut into at least one of said plates at said contact plane, said recess comprising at least two annular portions of different dimensions perpendicular to said contact plane;
b. said elastomeric seal means comprising a ring, the cross section of said ring comprising at least two parts adapted to fit at least two portions of said recess, the part of said ring of smaller radius adapted to extend radially inward of the wall of said bore to seal against said piston; and
c. a thin reinforcing web molded in said elastomeric seal means, the web being of short dimension perpendicular to said contact plane and in a plane parallel to said contact plane, the web being positioned intermediate the edges of the ring portion of shortest dimensions.

* * * * *